Oct. 4, 1966   J. D. CONTI   3,276,652
TENSION APPARATUS FOR TRAVELLING WEBS
Filed May 14, 1964
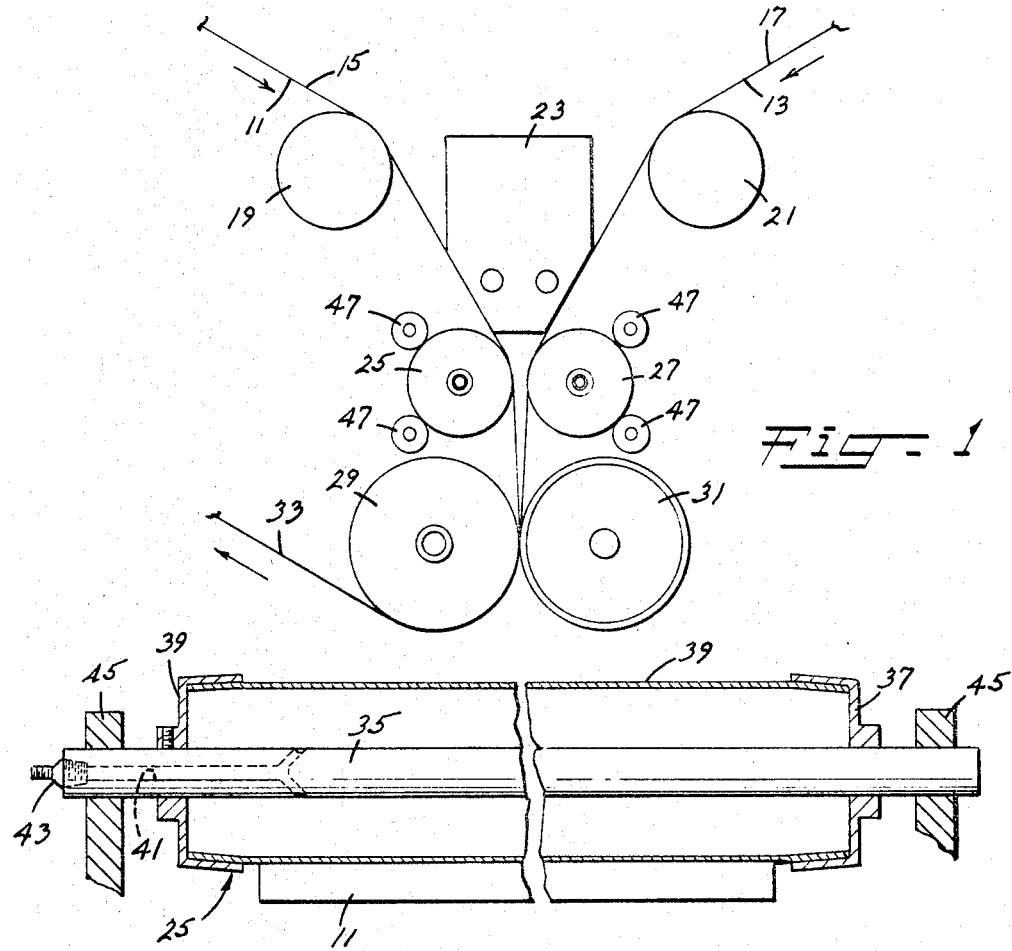
Fig. 1
Fig. 2
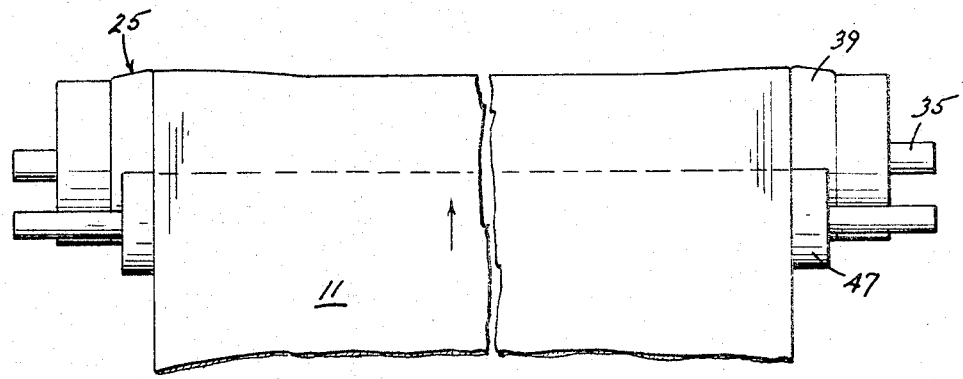
Fig. 3

United States Patent Office 3,276,652
Patented Oct. 4, 1966

3,276,652
TENSION APPARATUS FOR TRAVELLING WEBS
John D. Conti, Elkins Park, Pa., assignor to FMC Corporation, Philadelphia, Pa., a corporation of Delaware
Filed May 14, 1964, Ser. No. 367,456
3 Claims. (Cl. 226—191)

The present invention relates to an improved apparatus for conveying webs having stretched areas or other gauge variations.

In many operations, webs having stretched areas or other gauge variations are difficult or impossible to satisfactorily process. For example, with webs having floppy longitudinal edges, which may be due to improper shaping and/or because of stretching, the edge portions generally remain slack while the remainder of such web is tensioned. During printing, slippage often occurs between the printing rolls and the floppy edges of such web so that the printed matter along these areas may be distorted and/or out of alignment with adjacent printed areas. Similarly when bonding a pair of such webs together, slippage may occur between the contacting edge portions of the webs. As a result, the finished laminated product exhibits wrinkled longitudinal edge portions.

In both of the above noted operations, and in other similar procedures, the slippage which occurs is the result of a change in the speed of a floppy longitudinal edge portion of the web relative to the speed of an adjacent tensioned area. In other words, while the tensioned areas of the web normally travel at a constant rate of speed, the floppy longitudinal edges are not under positive control and thus their speed of travel may vary widely during the particular web processing operation. Moreover, since a gauge variation along one part of a web is usually not uniform along its entire length and would differ from gauge variations which might occur along other portions of the web, it has been impossible to predict when or where the slippage of the web will occur or the extent or duration and frequency of such slippage. Accordingly, a primary object of this invention is to provide a generally new or improved and more satisfactory apparatus for conveying webs having stretched areas or other gauge variations.

Another object is the provision of an apparatus for preventing or minimizing slippage between portions of an advancing web having stretched areas or other gauge variations and another moving member.

Still further objects will appear from the following description.

These objects are accomplished in accordance with the present invention by an apparatus in which tension control is exercised substantially across the entire width of an advancing web having stretched areas or other gauge variations. More particularly, in accordance with the present invention, tension is applied to a travelling web having stretched areas or other gauge variations in such manner as to cause the different portions of the web to travel paths which are of unequal length. The speed of the individual portions of the web is permitted to change in response to variations in the gauge of the advancing web, while the relative speed of such different web portions remains substantially constant throughout the web travel.

In general, the apparatus of the present invention includes a tension roll which is employed in combination with web delivery and advancing means. This tension roll is composed of a central shaft, a pair of annular end plates, a thin-walled sleeve or tubing formed of a highly resilient rubber or like material which is fixed to the end plates in fluid-tight relationship, and means for introducing air or other fluid under pressure into the roll. A cradle comprised of a pair of elongated rollers engages with and supports the tension roll against bowing when pressure is applied to its resilient surface. The resilient tension roll and its elongated supporting rollers are preferably turned by the movement of the web but may be positively driven if desired.

For the sake of clarity and simplicity, the apparatus of the present invention are hereafter described as applied to laminating a pair of continuous, transparent cellophane webs which are provided with thermoplastic coatings on at least the opposing sides thereof. A detailed description of the laminating procedure appears in my application entitled, "Laminating Method and Apparatus," Serial No. 246,932, filed December 26, 1962. It will be understood that the tension roll of the present invention is not limited to the use of any particular web delivery and/or advancing means, and that the apparatus hereafter described are suitable for use with a variety of web materials and in other procedures including those involving only a single web.

In the drawing, FIGURE 1 is an end view of a laminating apparatus which includes the tension roll and supporting cradle of the present invention;

FIGURE 2 is a longitudinal section through the roll of the present invention; and FIGURE 3 is a view illustrating the roll of the present invention during use.

Referring now to the drawing, transparent regenerated cellulose films or webs which are to be laminated are indicated at 11 and 13 and are supplied from separate rolls with their coated sides 15 and 17 disposed in opposing relationship. These webs are laced about guide rolls 19 and 21, engaged with a conventional heated shoe 23 and then passed over tension rolls 25 and 27. The coated sides 15 and 17 of the webs 11 and 13 are heated to a tacky condition by the shoe 23 and are engaged with each other as they leave the tension rolls and move in-between a heated temperature roll 29 and a cooperating rubber-covered pressure roll 31. The composite or laminated product which results, indicated at 33, is cooled to room temperature and is subjected to further processing as described in my above noted pending application.

In the apparatus thus far described, the guide rolls 19 and 21 serve to direct or deliver the webs 11 and 13 into and along desired paths adjacent to the heated shoe 23, and are preferably idler rolls. The cooperating temperature and pressure rollers 29 and 31, in addition to firmly pressing the heated webs together, serve to advance the webs along their respective paths and are therefore continuously driven, preferably at a uniform rate of speed.

The rolls 25 and 27 are of identical construction and are designed to tension the webs 11 and 13 substantially across their entire widths, regardless of the presence of stretched areas or other gauge variations. As shown in FIGURE 2 of the drawing, the tension rolls 25 and 27 each include a central shaft 35, a pair of rigid, annular end plates 37 and a thin-walled sleeve or tubing 39 which is formed of highly resilient rubber or like material. The end plates 37 are fixed in fluidtight relationship to both the shaft 35 and the ends of the sleeve 39. The shaft 35 is hollowed at 41 and is provided with a valve 43 through which air or other fluid may be delivered into the roll sleeve under pressure.

Each of the tension rolls is rotatably carried by suitable bearings 45 and is engaged by a cradle comprised of at least one pair of rollers 47 which support the roll sleeve against bowing when pressure is applied to its surface. For proper support of the tension rolls 25 and 27, the rollers 47 of each cradle are arcuately spaced less than 180° and are of substantially the same length as the tension roll sleeves. In the apparatus illustrated in FIG- URE 1, the rolls 25 and 27 are idler rolls but may be positively driven, if desired.

As heretofore mentioned, the rolls 25 and 27 serve to tension the web 11 and 13 in a longitudinal direction as they travel from the guide rolls 19 and 21 to the cooperating temperature and pressure rolls 29 and 31. Of particular importance, however, is that the resilient sleeves of the tension rolls are adapted to automatically adjust themselves so that the tension applied to any particular portion of a web will depend upon its cross section or gauge. For example, with webs having stretched or floppy longitudinal edges, the central portion of such web would exert pressure upon the sleeve of the tension roll. However, since such tension roll is prevented from bowing away from the web by the rollers 27, the contained air or other fluid would redistribute itself within the tension roll sleeve and cause the unrestrained portions thereof to bulge or expand outwardly into contact with adjacent portions of the web. In other words, and as shown in FIGURE 3, the contour of the tension roll sleeve automatically adjusts itself to conform to the configuration of that portion of the web with which it is engaged.

By varying the surface of the tension roll to accommodate the particular web, as described above, the web is engaged substantially across its entire width. More important, such tension roll insures that the central and edge portions of the web, that is the portions of different gauge, will travel at the same relative speed as they approach and pass in-between the cooperating temperature and pressure rollers. In other words, since the central portion of the web would normally travel at a faster rate of speed than the floppy longitudinal edge portions thereof, the tension roll compensates for this difference in speeds by causing the floppy longitudinal edges of the web to travel paths which are longer than those traveled by the central portion of such web. As a result, portions of the web which are adjacent to each other enter in-between the temperature and pressure rollers at substantially the same time so that distortion of one or both of the webs during the actual laminating operation is avoided.

From the above description, it will be apparent that the tension roll sleeves must be formed of highly resilient rubber or similar material and must be thin in cross-section to enable the same to sense and respond rapidly to gauge variations along the webs which are being conveyed. While the amount of air contained within the tension roll sleeves may be varied, it should be such as to permit the sleeves to yield in response to different tensions applied across the width of the web and yet render such sleeves highly responsive to web gauge variations.

It is to be understood that changes and variations may be made without departing from the spirit and scope of the invention as defined in the appended claims.

I claim:

1. A web tensioning apparatus including a roll having a rotatable shaft, a pair of rigid, annular end members fixed to said shaft in longitudinally spaced apart and fluid-tight relationship, a thin-walled sleeve extending between and being connected only to said end members in fluid-tight relationship, said sleeve formed of resilient material so as to yield readily in response to pressure applied to the surface thereof, a valve for introducing a fluid under pressure into said sleeve, and a cradle including a plurality of elongated, generally rigid rollers disposed substantially parallel to the axis of said roll, said rollers being separated arcuately less than 180° from each other and engaging with said resilient sleeve for preventing the same from bowing relative to the roll axis when pressure is applied to the surface of said roll.

2. Apparatus for advancing and longitudinally tensioning a continuous web including means for engaging and positively advancing a web, means for delivering a web to said advancing means, a roll positioned between said web delivery and advancing means for longitudinally tensioning a web substantially across its entire width, said roll having a rotatable shaft, a pair of rigid, annular end members fixed to said shaft in longitudinally spaced apart and fluid-tight relationship, a thin-walled sleeve extending between and being connected only to said end members in fluid-tight relationship, said sleeve formed of resilient material so as to readily yield in response to pressure applied to the surface thereof, a valve for introducing a fluid under pressure into said sleeve, and means engaged with said roll along its length for preventing said sleeve from assuming a longitudinally bowed configuration relative to the roll axis when pressure is applied to the surface of said roll whereby said sleeve is adapted to automatically flex to conform its surface substantially with the portion of a travelling web which is engaged therewith.

3. Apparatus as defined in claim 2 wherein said last mentioned means includes a cradle formed of at least a pair of elongated, generally rigid rollers disposed substantially parallel to axis of said roll, said rollers being separated arcuately less than 180° and engaging with said resilient sleeve for preventing the same from bowing relative to the roll axis when pressure is applied to the surface of said roll.

References Cited by the Examiner

UNITED STATES PATENTS 3,111,285  11/1963  Coker et al. _____ 226—195 X

OTHER REFERENCES

Janssen: German application B 26081, published Aug. 23, 1956.

ROBERT B. REEVES, *Primary Examiner.*